Nov. 25, 1969   L. L. CSIZMAS ET AL   3,480,400
PLACEMENT DEVICE
Filed March 21, 1966
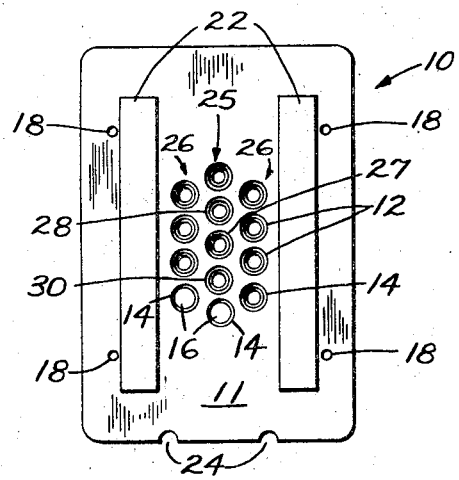
FIGURE 1.
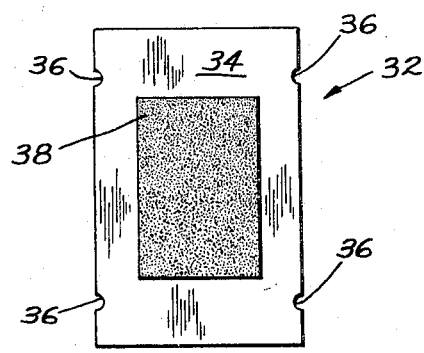
FIGURE 2.
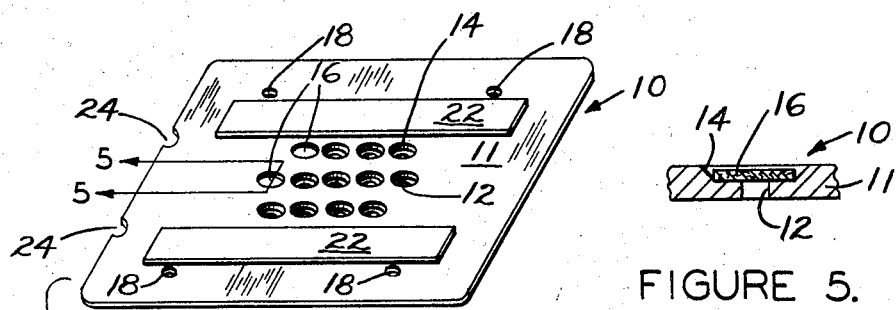
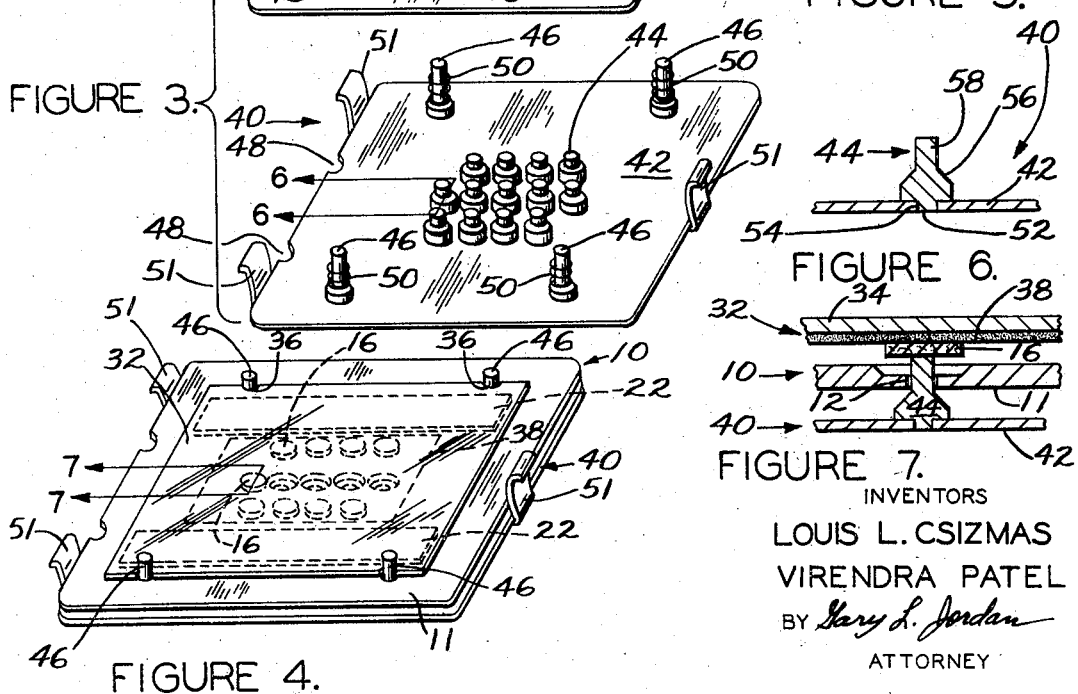
FIGURE 3.
FIGURE 4.
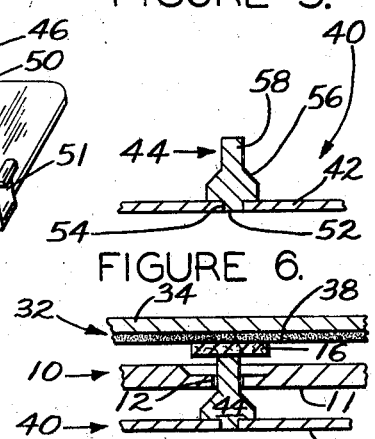
FIGURE 5.
FIGURE 6.
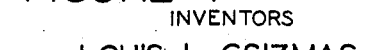
FIGURE 7.
INVENTORS
LOUIS L. CSIZMAS
VIRENDRA PATEL
BY *Gary L. Jordan*
ATTORNEY United States Patent Office 3,480,400
Patented Nov. 25, 1969

3,480,400
PLACEMENT DEVICE
Louis L. Csizmas and Virendra Patel, Elkhart, Ind., assignors to Miles Laboratories, Inc., Elkhart, Ind., a corporation of Indiana
Filed Mar. 21, 1966, Ser. No. 535,831
Int. Cl. B01l 9/00
U.S. Cl. 23—259    13 Claims

ABSTRACT OF THE DISCLOSURE

A device for placing at least one reagent-containing transferable article onto a receiving means pursuant to carrying out chemical tests. A plurality of reagent-containing articles can be placed onto the receiving means. The device comprises in combination a positioning means for the reagent-containing transferable articles, a receiving means for the articles and a transferring means for moving the articles from the positioning means to the receiving means. The transferable articles are normally reagent-containing bibulous material discs and the receiving means is normally a gel layer in which the reagents contained in the discs can diffuse once they are placed in contact therewith. The device is of particular utility in conducting immunoprecipitin tests.

Background of the invention

This invention relates to a device by which articles may be accurately placed upon a receiving surface. More particularly, the invention relates to a device for the placement of liquid filled bibulous articles in accurate position upon semi-solid receiving surfaces.

One employment of this placement device is the accurate placement of bibulous material articles filled with reagent-containing liquids onto receiving surfaces such as gel layers for conducting biological and precipitation tests. In the past various practices have been followed in depositing reagents on gel layers. One of these practices has been the hand placing of reagent-filled bibulous paper discs on gel surfaces by tweezers. This procedure is not satisfactory, however, since the proper placement of the individual articles is difficult and there is always the possibility of some of the reagent dropping off the disc onto the gel layer. Another practice has been the cutting of wells into the gel, which wells are then used to hold liquids. Both of these practices incurred the danger of mechanical rupturing of the gel surface, especially if the discs or wells were closely spaced, and such rupturing often caused portions of the gel layer to separate from its support.

It is therefore an object of this invention to provide a placement device which will allow accurate prepositioning of articles with respect to each other and transfer of those articles to a receiving surface in a manner which accurately preserves the initial positioning of the articles with respect to one another.

Another object is to provide a placement device which is capable of prepositioning bibulous material articles when filled with reagent-containing liquids and transferring of such articles to a gel layer without any of the aforementioned disadvantages of the prior art practices.

Yet another object is to provide a placement device by the use of which micro-Ouchterlony immunoprecipitin tests can be conducted with improved sensitivity and facility.

The device of this invention has a wide range of utility in the prepositioning of transferable articles with respect to one another and the transfer of such prepositioned articles to a receiving surface. The articles handled by the device may be made of materials such as calendered paper, filter paper, solid plastic materials, sponges, metal discs and the like. The receiving surfaces may be any which are compatible with these various materials. Softened plastic materials and glue layers can be uniformly used to provide a receiving surface for all of these articles. Magnetically attractive receiving surfaces may be employed for metal discs while electrically attractive layers may be employed for all materials to which static electric charges may be imparted. For articles of filter paper a preferred utility is gained by reason of the fact that gel layers being semi-solid will retain moistened paper articles in contact therewith once initial contact has been made, providing the members are optimally wet.

The placement device of this invention is preferably used to deposit single reagents or a multiplicity of reagents onto the surface of various testing media by contact with said surfaces of bibulous material deposition members having absorbed therein solutions containing said reagents. Primary among these media are gel layers on which various biological and precipitation tests are conducted. The device may also be used to deposit reagents pursuant to immunoelectro-osmosis and electrophoretic studies. Discs tests wherein various materials are deposited on pre-inoculated gel layers to accelerate or retard bacterial growth on the gel may be advantageously conducted by using the placement device of this invention to place reagent-containing paper discs on the gel layer surface. Another main utility is the depositing of a reagent which precipitates with another reagent in the testing media.

The primary application of a testing procedure based on such precipitation is an immunological test which employs a gel layer and is known as the Ouchterlony immunodiffusion precipitin method. In this method a quantity of an antigen is introduced into a gel layer at a first position and a suspected antibody-containing sample is introduced at a second position adjacent but spaced from the first position. If a line of precipitation forms in the gel between the two positions the conclusion can be made that the sample introduced contained antibody for the particular antigen. By studying relative positioning and density of the precipitation lines the antibody concentration or the antigen concentration can be estimated.

By using the placement device of this invention to position and transfer bibulous material articles containing immunological reagents onto gel surfaces the absence, presence, increase or decrease of immunological chemicals in various fluids may be detected. For blood plasma components one can establish such information for gamma-globulin, genetic globulin, haptoglobin, fibrinogen, $B_2$ macro-globulin (Waldenströms), C-reactive protein and myeloma protein. For forensic medicine determinations it is also possible to identify the species source of a given blood sample. Information concerning Bence-Jones protein in urine can be elicited by use of the present invention in a more advantageous manner than by following the practices of the prior art.

Various antibodies and antigens in body fluids such as blood, urine, spinal fluids, cerebrospinal fluid, pleural fluid, peritoneal fluid, and synovial fluids may be detected and quantified by employing the device of the present invention for reagent deposition onto gel layers. Bacterial diseases such as tuberculosis, cholera and brucellosis can be detected in this manner, as can mycological diseases such as histoplasmosis, cryptoccocois, aspergillosis, listeriosis, and coccidiomycosis. Other uses are detection of parasitological diseases such as amebiasis, malaria, and toxoplasmosis; viral diseases such as pox virus, echo virus, and Coxsackie virus, and allergenic disorders caused by various inhalants such as ragweed.

For detection of many of these diseases the presence of the antibody to the organism or inhalant is tested for in a blood fraction sample by employing a known amount of the organism or inhalant. The procedure can be reversed, however, to test for the antigenic material.

The antibody and antigen can be simultaneously added to the gel layer by use of the present device or may be added according to a timed relationship.

These and other features, and advantages will appear to those familiar with this art from the following detailed description of the placement device which appears in the accompanying drawings.

In the drawings:

FIGURE 1 is a plan view of the positioning means portion of a placement device in accordance with the present invention;

FIGURE 2 is a plan view of a receiving device adapted for use with the positioning means of FIGURE 1;

FIGURE 3 is an exploded perspective view showing the transfer means portion of the placement device of the present invention spaced below and in alignment with the positioning means portion of said device;

FIGURE 4 is a perspective view of the portions of the placement device in assembled relation wherein the receiving device of FIGURE 2 is registered with and in an inverted position above the positioning means of FIGURE 1, which in turn is registered with and resting upon the transfer means of FIGURE 3;

FIGURE 5 is an enlarged vertical sectional view taken on line 5—5 of FIGURE 3 showing a positioning recess of the positioning means accommodating one of the transferable articles handled by the placement device;

FIGURE 6 is an enlarged vertical sectional view taken on line 6—6 of FIGURE 3 showing one of the upstanding studs of the transfer means; and FIGURE 7 is an enlarged vertical sectional view taken on line 7—7 of the assembly of FIGURE 4 showing the cooperation of the transfer means with the positioning means, a transferable article, and the receiving device of the present invention.

Referring now to FIGURE 1, the illustrated positioning means 10 comprised of a flat rectangular plate 11 is formed with a plurality of spaced apertures 12 therethrough which have shallow concentric circular recesses or counterbore portions 14 at the upper end thereof which are adapted to accommodate therein circular transferable articles and afford retaining or shoulder means preventing transverse movement thereof. A pair of circular transferable articles 16 which may be paper discs are shown positioned in accommodating recesses 14 as shown in detail in FIGURE 5.

The plurality of spaced apertures 12 are arranged in a central row 25 and two generally parallel outer rows 26. The apertures in row 25 are equally spaced and as illustrated are five in number. The apertures of the two outer rows 26 are transversely aligned and are spaced apart the same distance as those of row 25, there being four apertures in each of the rows 26. The apertures of the central row 25 are staggered with respect to the apertures of outer rows 26 and form therewith two hexagonal patterns respectively surrounding centrally disposed apertures 28 and 30 and sharing a common aperture 27.

Registration holes 18 are provided in plate 11 near each corner thereof and spacing means which may be in the form bars 22 which extend lengthwise along the upper surface of plate 11 between the outermost rows 26 and the adjacent registration holes 18. Scallops 24 may be provided in one edge of the plate 11 to provide for mating of the positioning means 10 with an external jig (not shown) if required.

FIGURE 2 shows a receiving device 32 which is formed of a flat rectangular plate 34 having notches 36 positioned in the longitudinal edges thereof near each corner for alignment with registration holes 18 of positioning means 10. A centrally disposed rectangularly shaped gel layer 38 is suitably secured to plate 34 over an area which is slightly less than the area of plate 11 of FIGURE 1 described by the inner edges of spacing bars 22. This gel layer 38 functions as a receiving surface for paper discs 16.

In FIGURE 3 a transfer means 40 is shown positioned below and in alignment with positioning means 10. Transfer means 40 is formed of a flat rectangular carrier member 42 which is of the same peripheral dimension as plate 11 of FIGURE 1 and carries a plurality of upstanding studs 44 arranged in the same pattern as the apertures 12 of plate 11 so as to permit entry of one of said studs into and through each of the apertures 12 of positioning means 10.

As shown in detail in FIGURE 6 each stud 44 may comprise a thick base portion 56, an upstanding rod portion 58 and a depending pin portion 52 which may have a tight press fit within a receiving opening 54 in carrier member 42. Rod portion 58 has a diameter smaller than the diameter of the apertures 12 so that it will pass therethrough.

Upstanding pins 46 are integrally affixed to the carrier member 42 near each corner thereof and provide a registration means for cooperation with positioning means 10 and receiving device 32 on assembly of the placement device. Registration holes 18 of positioning means 10 and notches 36 of receiving device 32 fit about pins 46 and thereby provide cooperating registration means between the major elements of the placement device to determine relative location thereof. Carrier member 42 may be provided with scallops 48 for cooperation with an external jig (not shown) if required. A coil spring 50 is disposed about each pin 46 and provide a resilient means for cooperation between transfer means 40 and positioning means 10 to bias them away from contact with one another when they are combined for use. Upstanding arcuate spring fingers 51 extend from the ends of the carrier member 42 and function to secure the positioning means 10 thereto when in assembled relation and to aid in registration of the parts during assembly.

For employment of the placement device a plurality of paper discs 16 are first wetted with a reagent-containing liquid and are then placed one in each of the recesses 14 of positioning means 10. The thus loaded positioning means 10 is then registered with transfer means 40 by entry of pins 46 into registration holes 18 and is allowed to rest on the coil springs 50 and spring fingers 51. Receiving device 32 is then inverted and placed on spacing bars 22 of the positioning means between the pins 46 with the notches 36 receiving said pins and affording registration with the positioning means 10 such that the gel layer 38 is suspended between and out of contact with said spacing bars.

Positioning means 10 and transfer means 40 are then pressed together against the resilient force of coil springs 50 and spring fingers 51, the latter being forced outwardly by engagement of the adjacent edges of the plate 11 therewith as said plate approaches the plate 42 until said edges pass the midpoint of said fingers; after which said fingers move inwardly, exerting a force tending to move the plate 11 toward the plate 42. FIGURE 4 shows positioning means 10 and transfer means 40 held in assembled relation by the action of the arcuate spring fingers 51 against the resilient force of coil springs 50 tending to separate them.

As the positioning means 10 of FIGURE 3 is moved downwardly toward the transfer means 40 as aforedescribed the spacing therebetween decreases to that illustrated by the relative spacing between FIGURES 5 and 6. The paper discs 16 are thereby lowered with positioning mean 10 onto the flat upper ends of the studs 44 and are supported by said studs as the positioning means 10 continues its downward movement and moves out of contact with said paper discs. The receiving device 32, being supported by the positioning means 10, moves downwardly therewith until the gel layer 38 thereof contacts the upper surface of the paper discs 16 as shown by FIGURE 7, and further downward movement of the positioning means 10 moves the latter out of supporting engagement with the receiving device. Thus, when the elements are in the assembled position of FIGURE 4 the receiving device 32 is supported by the studs 44 of the transfer device 40 through the paper discs 16, and the weight of the receiving device creates a pressure contact of the paper discs 16 with the gel layer 38.

The paper discs, when thus contacting the gel layer 38, are in precisely the same positional relationship with respect to each other as they were when they were disposed in the recesses 14 of the positioning means 10. The receiving device 32, with the paper discs 14 adhered thereto in the pattern predetermined by the positioning device 10, can then be conveniently lifted off of the assembly and turned upright for use.

In FIGURE 4 receiving device 32, positioning means 10, and transfer means 40 are registered one with respect to the others by means of the registration pins 46 extending through registration holes 18 of plate 11 and into notches 36 of plate 34. Spacer bars 22 can be seen in dotted lines as can the centrally disposed gel layer 38 on the under side of transfer device 32. Gel layer 38 being of a semi-solid character and the wetted paper discs 16 being of a bibulous material provide a relative adhesion which prevents relative motion of the discs once contact has been made with said gel layer. FIGURE 7 shows the elements of FIGURE 4 in superimposed relationship after transfer of the paper discs 16 to the gel layer. The rod portion 58 of an upstanding stud 44 is shown extending through an aperture 12 of positioning means 10 and supporting a paper disc 16 which, in turn, is in contact with the gel layer 38 supported thereon.

From the moment of contact between paper discs 16 and gel layer 38 the reagent-containing liquid in the discs begins to diffuse into the gel layer 38. An immunodiffusion precipitin test may be performed when the gel layer contains a known antigenic material and the reagent-containing liquid used to wet disc 16 is a body fluid sample suspected of containing the antibody against the particular antigenic material. If a circular line of precipitate forms in the gel layer about the position occupied by disc 16, the conclusion that the sample contained the antibody can generally be made. Usually a plurality of paper discs 16 to be used in testing are positioned in apertures 12 after wetting each with a different reagent or different concentrations of the same reagent. These can then be simultaneously deposited on the surface of gel layer 38 and precipitin lines formed by interaction of two or more of the reagents can be studied.

While the placement device of the present invention has been described primarily for the use in depositing immunological materials onto gel layer surfaces it will be appreciated that it is capable of depositing many different organic and inorganic materials in liquid mixtures of the same onto various receiving surfaces. Further, it will be appreciated that the combination of the positioning means and the transfer means can be used to deposit a variety of movable members onto receiving devices of various types, and the invention contemplates all such uses.

For the uses specifically described it is preferable if all elements of the placement device are made from materials which are either nonflammable or disposable so that contamination from test to test is avoided. Stainless steel is preferred for the first type of material, whereas polymeric materials are peferred for the latter type.

If desired, recesses 14 of positioning means 10 may be numbered in a mirror image fashion (not illustrated) so that discs deposited on the gel layer will be placed in an easily coded sequence.

What is claimed is:

1. A device for placing at least one reagent-containing transferable article on a receiving means comprising in combination, positioning means having a surface portion for supporting said at least one transferable article in a given position and having retaining means preventing substantial lateral movement of at least one article with respect to said surface portion when in said given position, said receiving means being spaced from and in opposing relation with respect to said surface portion of said positioning means and in position to be contacted by said at least one transferable article when said article is moved from said given position, and transfer means associated with said positioning means adapted to move at least one transferable article from said given position in a direction away from said supporting surface portion and into contact with said receiving means.

2. The device of claim 1 having registration means cooperating between said positioning means and said transfer means to determine the relative location of said positioning means and said transfer means with respect to one another.

3. The device of claim 1 having resilient means cooperating between said positioning means and said transfer means to bias said means away from one another.

4. The device of claim 1 having resilient spring finger means cooperating between said positioning means and said transfer means to bias said transfer means away from said positioning means as said transfer means is moved toward said positioning means and then to bias said transfer means toward said positioning means after said transfer means is moved to a predetermined position.

5. The device of claim 1 wherein said retaining means is arranged to retain a plurality of transferable articles in a predetermined pattern, and wherein said transfer means is adapted to transfer said plurality of articles to said receiving device from said positioning means in said predetermined pattern.

6. The device of claim 1 wherein said transferable articles are of a bibulous material.

7. The device of claim 1 wherein said transferable articles are of a bibulous material, and wherein said combination includes a receiving device having gel layer and a support therefore spaced from said surface portion of said positioning device with said gel layer facing said transferable articles.

8. The device of claim 1 wherein said surface portion has formed therethrough an aperture aligned with each transferable article and wherein said transfer means comprises a carrier member and at least one stud secured to said carrier member, said stud being configured to permit entry thereof into said aperture for contact with said transferable article.

9. A device for placing at least one reagent-containing liquid filled bibulous material transferable article in contact with a receiving surface, comprising positioning means having a surface portion and at least one aperture formed therethrough, at least one bibulous material article resting on said surface portion in alignment with said aperture, means providing a receiving surface, and transfer means including at least one member adapted to extend through said aperture in said surface portion of said positioning means to engage said bibulous material article thereon and move the latter from said surface portion into contact with said receiving surface.

10. The device of claim 9 wherein said surface portion is formed with a plurality of spaced apertures therethrough and wherein said transfer means comprises a carrier member and a plurality of upstanding studs secured to said carrier member, said stubs being configured and arranged to permit entry thereof into said plurality of apertures and contact with a plurality of transferable articles on said surface portion aligned with said apertures.

11. The device of claim 9 wherein said surface portion is formed with a plurality of apertures therethrough arranged in a predetermined pattern and wherein said transfer means comprises a carrier member and a plurality of upstanding studs secured to said carrier member, said studs also being arranged in said predetermined pattern to permit entry into said plurality of apertures and contact with a plurality of transferable articles on said surface portion aligned with said apertures, said transfer means being adapted to transfer said plurality of transferable articles to said receiving surface from said positioning means in said predetermined pattern.

12. The device of claim 9 including retaining means at each aperture configured to prevent lateral movement of a bibulous material article relative to said positioning means.

13. The device of claim 12 wherein said retaining means comprises a recess in said surface portion of said positioning means aligned with each aperture for receiving and retaining a transferable article.

References Cited

UNITED STATES PATENTS

| | | | |
|---|---|---|---|
| 2,092,938 | 9/1937 | Stebler | 21—80 X |
| 2,422,584 | 6/1947 | Rickard. | |
| 2,639,050 | 5/1953 | Hoffmann | 214—310 |
| 3,151,754 | 10/1964 | Kemp | 214—310 |
| 3,378,481 | 4/1968 | Saravis | 23—253 X |
| 3,378,347 | 4/1968 | Saravis | 23—253 |
| 3,401,087 | 9/1968 | Kuzel et al. | 23—230 X |

MORRIS O. WOLK, Primary Examiner

ELLIOTT A. KATZ, Assistant Examiner

U.S. Cl. X.R.

23—253, 292